(12) United States Patent
Berger et al.

(10) Patent No.: US 11,900,010 B2
(45) Date of Patent: Feb. 13, 2024

(54) METHOD OF MANAGING AN AUDIO STREAM READ IN A MANNER THAT IS SYNCHRONIZED ON A REFERENCE CLOCK

(71) Applicant: SAGEMCOM BROADBAND SAS, Rueil Malmaison (FR)

(72) Inventors: Jérôme Berger, Rueil Malmaison (FR); Gabriel Bouvigne, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 244 days.

(21) Appl. No.: 17/148,119

(22) Filed: Jan. 13, 2021

(65) Prior Publication Data

US 2021/0311692 A1 Oct. 7, 2021

(30) Foreign Application Priority Data

Apr. 1, 2020 (FR) ...................................... 2003258

(51) Int. Cl.
| | |
|---|---|
| *G06F 3/16* | (2006.01) |
| *G06F 16/635* | (2019.01) |
| *G06F 1/12* | (2006.01) |
| *H04J 3/06* | (2006.01) |

(52) U.S. Cl.
CPC ................ *G06F 3/165* (2013.01); *G06F 1/12* (2013.01); *G06F 16/637* (2019.01); *H04J 3/0632* (2013.01)

(58) Field of Classification Search
None
See application file for complete search history.

(56) References Cited

U.S. PATENT DOCUMENTS

2007/0116057 A1   5/2007 Murphy et al.

FOREIGN PATENT DOCUMENTS

| CA | 3155380 A1 * | 3/2021 | ....... H04N 21/41407 |
|---|---|---|---|
| EP | 1815713 A1 | 8/2007 | |

* cited by examiner

*Primary Examiner* — Walter F Briney, III
(74) *Attorney, Agent, or Firm* — Muncy, Geissler, Olds & Lowe, P.C.

(57) ABSTRACT

A method of managing an audio stream that is read by audio playback equipment in a manner that is synchronized on a reference clock is provided. The method includes the following steps implemented in said piece of audio playback equipment: receiving the audio stream, the audio stream being in the form of packets, each packet comprising a succession of audio samples associated with identification information characteristic of a timestamp of said packet; playing the audio samples contained in each packet and storing a time given by the reference clock that is characteristic of the moment at which a predetermined sample of at least one of the packets is played; and sending a message including correspondence information concerning the correspondence between the identification information characteristic of a timestamp of said packet and the time stored in the preceding step.

17 Claims, 2 Drawing Sheets

METHOD OF MANAGING AN AUDIO STREAM READ IN A MANNER THAT IS SYNCHRONIZED ON A REFERENCE CLOCK

The invention relates to the field of audio playback via one or more pieces of playback equipment.

BACKGROUND OF THE INVENTION

In modern multimedia installations for the home, it is nowadays very common to connect decoder equipment, of the set-top box (STB) type, to one or more pieces of audio playback equipment.

Specifically, the pieces of audio playback equipment can thus be grouped together so as to be able to play the same audio stream simultaneously, thereby improving the listening experience of the user. For example, two pieces of audio playback equipment may be arranged in two different rooms in a home, with the audio stream being played simultaneously by said pieces of equipment then enabling the user to move between those two rooms without interruption to listening.

Thus, it is known to require the pieces of audio playback equipment to play the audio stream in a manner that is synchronized on the basis of an external clock. For example, use may be made of smartspeakers employing a protocol of the network time protocol (NTP) or of the precision time protocol (PTP) type for receiving the external clock, with the smartspeakers then timing the reading of the audio stream via an internal hardware clock that is configurable. Typically that clock is generated by a component of the phase-locked loop (PLL) type that serves to subdivide a reference clock (as supplied by a quartz crystal). PLLs serve to configure the applied subdivision finely, and the associated smartspeaker adjusts the subdivision parameters dynamically so that the configurable internal hardware clock generated by the PLL tracks the external clock very closely.

Although that solution is effective, it requires each smartspeaker to be provided with a hardware clock that is configurable, which makes it expensive and complicated to implement.

OBJECT OF THE INVENTION

An object of the invention is to provide a method that makes it easier for audio equipment to read an audio stream in a manner that is synchronized on a reference clock.

SUMMARY OF THE INVENTION

In order to achieve this object, the invention provides a method of managing an audio stream that is read by audio playback equipment in a manner that is synchronized on a reference clock, the method comprising at least the following steps implemented in said piece of audio playback equipment:
  receiving the audio stream, the audio stream being in the form of packets, each packet comprising a succession of audio samples associated with identification information characteristic of a timestamp of said packet;
  playing the audio samples contained in each packet and storing a time given by the reference clock that is characteristic of the moment at which a predetermined sample of at least one of the packets is played;
  sending a message including correspondence information about correspondence between the identification information characteristic of a timestamp of said packet and the time stored in the preceding step.

As a result, the invention enables audio playback equipment to read an audio stream in a manner that is synchronized on a reference clock without any need for special hardware resources in said audio playback equipment.

The invention is thus simple and inexpensive to implement.

Optionally, the correspondence information consists in the value of said identification information and said stored time.

Optionally, the correspondence information consists in the gradient of a linear regression line between said identification information and said stored time.

Optionally, the method further comprises the following steps implemented in the audio playback equipment:
  splitting each received packet into blocks of audio samples;
  determining timestamp information corresponding at least to one block of audio samples both on the basis of the identification information characteristic of a timestamp of the packet from which the block in question is extracted and also on the basis of the number of samples between a particular sample of said packet and a given sample of said block;
  the stored time being characteristic of the given moment at which the given sample of said block is played and the correspondence information then being information about correspondence between said timestamp information corresponding to said block and said stored time.

Optionally, the method further comprises the following additional steps implemented in the audio playback equipment:
  for at least one packet N received by the audio playback equipment, calculating expected identification information characteristic of a timestamp expected for the following packet N+1, and adding together the identification information characteristic of a timestamp of the packet that has just been received and its duration; and
  when the packet N+1 is received, comparing said expected identification information with the identification information of the packet N+1.

Optionally, if the identification information of the packet N+1 is later than the expected identification information, then the audio playback equipment plays compensation samples for a duration corresponding to the difference between the expected identification information and the identification information of the packet N+1.

Optionally, the compensation samples are silence and/or copies of the most recently played samples.

The invention also provides a method of managing an audio stream that is read in a manner that is synchronized on a reference clock and that is delivered via source equipment, the method comprising at least the following steps implemented in said source equipment:
  splitting the audio stream into packets, each packet comprising a succession of audio samples;
  associating each packet with identification information characteristic of a timestamp of said packet, which information is thus representative of the time at which a predetermined audio sample of said packet should be played by the audio playback equipment;
  receiving a message comprising correspondence information about correspondence between the identification information characteristic of a timestamp of at least one of the packets and the time given by the reference clock that is characteristic of the moment at which the predetermined audio sample of said packet was played; and as a function of said correspondence information, adjusting the speed at which the audio stream is read as a function of said correspondence information and/or adjusting the following packet before sending it.

Optionally, the step of adjusting the following packet is performed by adjusting the number of audio samples contained in the packet.

Optionally, the number of samples is adjusted by removing audio samples from said packet or by adding audio samples thereto.

Optionally, the following packet is adjusted by applying a re-sampling filter to said packet.

Optionally, the number of samples is adjusted while conserving a packet size that is identical to the size of the packet that was delivered previously.

The invention also provides audio playback equipment adapted to perform the method as specified above.

The invention also provides source equipment adapted to perform the method as specified above.

The invention also provides an installation comprising at least one first piece of audio playback equipment as specified above and a second piece of audio playback equipment configured to deliver the audio stream to said first piece of audio playback equipment, the second piece of audio playback equipment itself adjusting said stream if the other piece of audio playback equipment is not reading it at the proper speed.

The invention also provides an installation comprising at least one first piece of audio playback equipment as specified above and source equipment as specified above.

The invention also provides a computer program including instructions for causing audio playback equipment as specified above to execute the above-specified method.

The invention also provides a computer readable storage medium on which the above-specified computer program is stored.

The invention also provides a computer program including instructions for causing source equipment as specified above to execute the above-specified method.

The invention also provides a computer readable storage medium on which the above-specified computer program is stored.

Other characteristics and advantages of the invention appear on reading the following description of particular, nonlimiting implementations of the invention.

BRIEF DESCRIPTION OF THE DRAWINGS

The invention can be better understood in the light of the following description given with reference to the accompanying figures, in which.

DETAILED DESCRIPTION OF THE INVENTION

Figure 1:
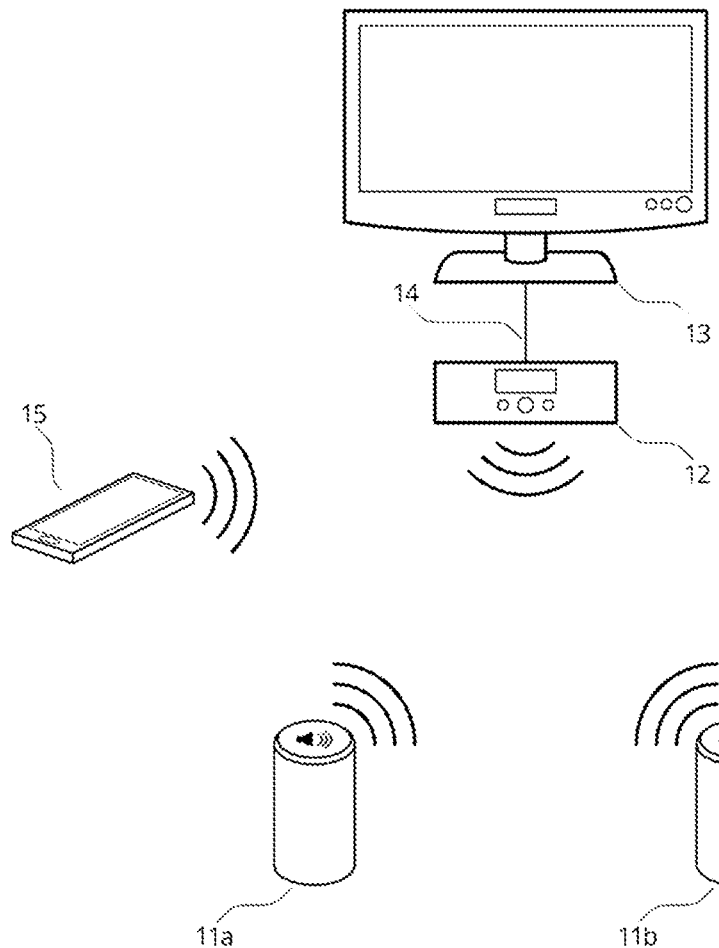
FIG. 1 is a diagram showing an installation enabling the invention to be implemented.

With reference to FIG. 1, there follows a description of an example of an installation capable of implementing the invention.

The installation is a multimedia installation comprising decoder equipment 12 that is connected in this example both to video playback equipment, in reality in this example to audio/video playback equipment 13, and also to audio playback equipment. In this example, the decoder equipment 12 acts as source equipment for two pieces of audio playback equipment 11a and 11b. Furthermore, in the present example, the pieces of audio playback equipment 11a and 11b are distinct both from the decoder equipment 12 and also from the audio/video playback equipment 13.

Furthermore, the installation also includes an appliance 15 for controlling the audio playback equipment 11a, 11b, preferably for controlling the audio playback equipment 11a, 11b and the decoder equipment 12, and more preferably for controlling the entire installation. In the present example, the appliance 15 is distinct not only from the decoder equipment 12, but also from the audio/video playback equipment 13 and from each of the pieces of audio playback equipment 11a and 11b.

In this example, the decoder equipment 12 is a decoder box, the audio/video playback equipment 13 is a television set, and the pieces of audio playback equipment 11a and 11b are external loudspeakers connected to said decoder box. In this example, the appliance 15 is a smartphone or indeed a tablet, the smartphone or the tablet has means for storing an application dedicated at least to controlling the decoder equipment 12 and the audio playback equipment 11a, 11b, such that executing this application enables at least the decoder equipment 12 and the audio playback equipment 11a, 11b to be controlled.

In service, the decoder equipment 12 acquires an audio/video multimedia stream from a communication interface of the decoder equipment 12, which stream may come from one or more broadcast networks. The broadcast networks may be of any type. For example, the broadcast network may be a satellite television network, with the decoder equipment 12 receiving an incoming audio/video stream via a parabolic antenna. In a variant, the broadcast network may be an Internet connection, with the decoder equipment 12 receiving the incoming audio/video stream via said Internet connection. In another variant, the broadcast network may be a digital terrestrial television (DTT) network or a cable television network. More generally, the broadcast network may be a variety of sources: satellite, cable, internet protocol (IP), DTT, a locally stored audio/video stream, etc.

The decoder equipment 12 includes processor means serving, amongst other things, to process the incoming audio/video stream.

Furthermore, the audio/video playback equipment 13 is connected to an audio/video output of the decoder equipment 12, and each piece of audio playback equipment 11a and 11b is connected to a respective audio output of the decoder equipment 12.

The term "audio/video output" is used to mean an output on which the decoder equipment 12 applies at least one audio/video signal in order to perform both audio playback and video playback via (at least) one piece of audio/video playback equipment 13 (specifically the television set). The term "audio output" is used to mean an output on which the decoder equipment 12 applies at least one audio signal in order to perform audio playback via (at least) one piece of audio playback equipment 11a, 11b (specifically the external smartspeakers). In reality, the audio signal (or audio stream) is split into packets of audio samples and is therefore delivered in packets to each destination piece of audio playback equipment.

Consequently, each piece of audio playback equipment 11*a* and 11*b* includes its own processor means for processing the audio stream delivered by the decoder equipment 12. By way of example, the processor means comprise a processor and/or calculation means and/or a microcomputer . . . . In the present example, the processor means comprise a processor.

Typically, the processor means include a memory zone storing software that, when executed, serves to read the audio stream delivered by the decoder equipment 12. More precisely, the audio stream is read by receiving packets of audio samples from the decoder equipment 12 and by injecting said samples into an input buffer memory of the audio playback equipment in question. The buffer memory is arranged at the input of the playback means of the audio playback equipment in question. By way of example, the playback means comprise a sound card, a digital-to-analog converter, one or more loudspeakers, . . . .

The buffer memory possesses a certain amount of capacity (e.g. 200 milliseconds (ms)) and the playback means thus play the samples present in the buffer memory at a regular rate (e.g. at 48 kilohertz (kHz)). When the filling level of the buffer memory drops below a determined threshold (e.g. 190 ms), the playback means send an interrupt to the processor means. After that, the processor means inject new audio samples into the buffer: more precisely, the software then causes a new block of audio samples (e.g. a 10 ms block) to be copied to the end of the buffer memory.

Furthermore, as mentioned above, the appliance 15 serves to send orders to the decoder equipment 12 and to the audio playback equipment 11*a*, 11*b*, thereby enabling the user to manage the installation via the appliance 15, e.g. via a graphics control interface of the appliance 15, such as a touchscreen of the appliance 15.

Typically, the user can use the appliance 15 to send an order to the decoder equipment 12 so that the decoder equipment 12 sends an audio stream to the selected piece(s) of audio playback equipment 11*a* and 11*b* so that they play the audio stream in synchronous manner. Under such circumstances, the decoder equipment 12 may send different channels to different pieces of audio playback equipment 11*a* and 11*b*. For example, with a stereo audio stream having two channels, the decoder equipment 12 can send the left channel to one of the pieces of audio playback equipment 11*a* and the right channel to the other one of the pieces of audio playback equipment 11*b*. The decoder equipment 12 can equally well send both the right and the left channels to one only of the two pieces of audio playback equipment 11*a*, which in turn plays back only the left channel and transfers the right channel (or the entire audio stream) to the other piece of audio playback equipment 11*b*, which then plays back only the right channel.

The user may also send an order to the decoder equipment 12 by means of the appliance 15 to cause the decoder equipment 12 to send an audio stream to only one of the pieces of audio playback equipment (or to both of the pieces of audio playback equipment 11*a* and 11*b*) and a video stream (or an audio/video stream) to the audio/video playback equipment 13 so that the selected piece(s) of audio playback equipment 11*a*, 11*b* play the audio stream in synchronous manner with the video (or with the video and the sound) played by the audio/video playback equipment 13.

It should be understood that it is assumed in this example that the pieces of audio playback equipment 11*a* and 11*b* retranscribing the same audio stream all belong to a single group, and that each piece of audio playback equipment 11*a* and 11*b* retranscribes the stream in full or in part by playing only one of the channels of said stream (e.g. for a stereo stream).

Depending on the configurations requested by the user, the grouping of the pieces of audio playback equipment 11*a*, 11*b* may thus vary over time.

In order to provide synchronization between the pieces of audio playback equipment 11*a* and 11*b* of the installation and/or the audio/video playback equipment 13 and/or between a plurality of (audio and/or video) streams passing through the installation, synchronization data is exchanged at least between the decoder equipment 12 and the pieces of audio playback equipment 11*a* and 11*b* and also between the decoder equipment 12 and the audio/video playback equipment 13.

In a particular embodiment, the decoder equipment 12 sends an audio stream to the audio playback equipment 11*a*, 11*b* by using a real-time transfer protocol (RTP). Specifically, this protocol provides for the audio stream to be split into packets and for the header of each packet to include synchronization data in the form of a timestamp field (described in section 5.1 of RFC 3550 associated with said protocol).

In another particular embodiment, the decoder equipment 12 sends an audio stream to audio playback equipment in the form of an MPEG "transport" stream conveyed in user datagram protocol (UDP) packets, the MPEG "transport" stream also enabling synchronization data (in the form of timestamps) to be associated with the various packets. Furthermore, the synchronization data also includes information characteristic of the reference clock, which is distinct from the audio stream.

In the present example, the reference clock is the internal clock of the decoder equipment 12.

For example, the decoder equipment 12 sends its clock to the pieces of audio playback equipment 11*a* and 11*b* by using an NTP protocol.

For example, the decoder equipment 12 sends directly to the pieces of audio playback equipment 11*a* and 11*b*, at least the following:
- the audio stream in the form of packets by means of an RTP or MPEG protocol;
- its clock using an NTP protocol;
- the clock not being contained in the audio stream so that the audio stream and the clock are conveyed in distinct manner.

The connection between the decoder equipment 12 and the audio/video playback equipment 13 may be wired or wireless. Any type of technology may be used for providing this connection: optical, radio, etc. The connection may thus be of various different "physical" kinds (e.g. high definition multimedia interface (HDMI), Toslink, RCA, etc.) and/or it may use various different "computer" protocols (e.g. Bluetooth, UPnP, Airplay, Chromecast, Wi-Fi, etc.).

In this example, the connection between the decoder equipment 12 and each piece of audio playback equipment 11*a* and 11*b* as used for conveying the audio link is wireless. Any type of technology may be used for providing this connection: optical, radio, etc. The connection can thus use various different "computer" protocols (e.g. Bluetooth, UPnP, Airplay, Chromecast, Wi-Fi, etc.). Alternatively, the connection could be wired, e.g. using an Ethernet protocol.

Thus, and in accordance with a nonlimiting option, the audio/video playback equipment 13 has an HDMI connection 14 with the decoder equipment 12, and the pieces of audio playback equipment 11*a* 11*b* are connected via a network local to the decoder equipment 12. By way of example, the local network may be a wireless network of Wi-Fi type. In another variant, the local network includes a Wi-Fi router, the decoder equipment 12 is connected to said Wi-Fi router by a wired connection of Ethernet type or is connected to the router by a wireless connection of Wi-Fi type. Furthermore, and independently of the link between the router and the decoder equipment 12, the pieces of audio playback equipment 11a and 11b may be connected to the Wi-Fi router by wireless connections of Wi-Fi type or by wired connections of Ethernet type.

In the same manner, the appliance 15 communicates with the decoder equipment 12 and with the pieces of audio playback equipment 11a and 11b, preferably by wireless communication. Any type of technology may be used for providing such communication: optical, radio, etc. This communication can thus use various different "computer" protocols (e.g. Bluetooth, UPnP, Airplay, Chromecast, Wi-Fi, etc.). Thus, and in accordance with a nonlimiting option, the appliance 15 is likewise connected via the local network both to the decoder equipment 12 and also to the various pieces of audio playback equipment 11a and 11b.

There follows a description of how the installation enables synchronized reading of a given audio stream.

It should be recalled that each of the selected pieces of audio playback equipment 11a and 11b receives from the decoder equipment 12 an audio stream that is to be played and that is in the form of packets of samples, each packet being associated with identification information characteristic of a timestamp of the packet in question, said information in this example being directly the timestamp of said packet (using an RTP or an MPEG protocol) and being referred to below as "first" timestamp information. By way of example, this first timestamp information is associated with the first sample of each packet.

Thus, in service, the decoder equipment 12 delivers packets of samples to the selected audio playback equipment, which packets are placed in a queue (contained in the decoder equipment 12 and/or in the audio playback equipment) prior to being injected into the buffer memory. It should thus be observed that a packet of samples need not necessarily have the same duration as a block of samples.

In reality, and preferably, there is no equivalence between the packets received by the selected audio playback equipment and the blocks that are injected into its buffer memory. Specifically, the communication performance between the selected audio playback equipment and the decoder equipment 12 is better if the received packets are not too small, but it is preferable to inject small blocks into the buffer memory in order to keep said buffer memory filled to a high level, thereby limiting latency. In nonlimiting manner, the received packets have a duration that is 3 to 7 times longer than the duration of the injected blocks, and for example 4 times longer. By way of example, the received packets have a duration of about 40 ms, or even more, while the injected blocks have a duration of about 10 ms.

Figure 2:
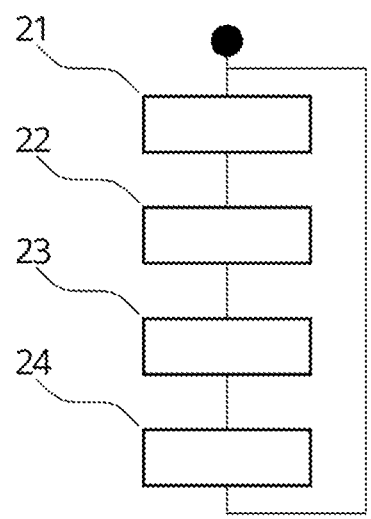
FIG. 2 is a diagram showing various steps in a particular implementation of the invention in audio playback equipment of the installation shown in FIG. 1.

Consequently, and as shown in FIG. 2, the audio playback equipment performs the following steps.

In a step 21, the processor of each piece of audio playback equipment waits to receive an interrupt from the playback means of said piece of equipment, said interrupt indicating that there is enough space in the buffer memory to receive a new block of samples.

In a step 22, on receiving an interrupt, the processor obtains a block of samples from the queue for injecting into the buffer memory.

In a step 23, the processor determines second timestamp information associated with said block, e.g. such as second timestamp information associated with the first sample of said block.

As mentioned above, the packets received by the audio playback equipment and the blocks injected into its buffer memory do not have the same duration.

Consequently, for one, several, or all of the blocks of a packet that has just been received, the processor calculates an offset between the first sample of said packet and the first sample of the block in question, which block is thus the block that has just been injected.

The processor multiplies this offset by a conversion ratio for converting a number of samples into timestamp information. Thereafter, the processor adds the result to the first timestamp information (i.e. the timestamp information of the received packet) in order to obtain the second timestamp information (i.e. the timestamp information of the injected block).

For example, with the RTP protocol, the first timestamp information is often already expressed directly as a number of samples, and consequently the conversion ratio is equal to 1.

The processor stores said second timestamp information.

In a step 24, the processor injects the block of samples into the buffer memory and stores the time given by the reference NTP clock at the moment when the first sample of the block is injected (referred to below as the first NTP time). Thereafter, concerning the buffer memory, the processor returns to the step 21.

Optionally, it is possible that packets sent by the decoder equipment 12 are not received by the selected audio playback equipment. That creates a hole in the data, and above all that can also give rise to the following packets being injected too soon, running the risk of falsifying the determinations performed in step 23.

In order to mitigate that problem, on receiving each packet, the selected audio playback equipment preferably calculates expected timestamp information for the following packet by adding together the first timestamp information of the packet that has just been received and the duration of that packet.

On receiving the following packet, the audio playback equipment compares the first timestamp information of the new packet with the expected timestamp information. If the first timestamp information of the new packet is later than the expected timestamp information, that means that packets sent by the decoder equipment 12 have not been received by the selected audio playback equipment. Under such circumstances, said audio playback equipment injects compensation samples into the buffer memory for a duration corresponding to the difference between the expected timestamp information and the first timestamp information of the new packet, prior to injecting the samples of the new packet. By way of example, the compensation samples may be silence, or else a copy of the most recent samples to be injected into the buffer memory.

Under all circumstances, concerning buffer memory and as mentioned above, after injecting samples, the processor returns to step 21.

In addition, the audio playback equipment sends a message to the decoder equipment 12 including at least correspondence information about correspondence between the first timestamp information and the first NTP time. In the present example, the message also includes the second timestamp information (which is thus linked to the first timestamp information) and the first NTP time.

By way of example, this message may be in the form of a JavaScript object notation remote procedure call (JSON-RPC) notification or of a UPnP event.

This message may be sent in regular manner, e.g. once every second.

This message may also be sent spontaneously by the audio playback equipment. Alternatively, the decoder equipment 12 may interrogate the audio playback equipment in order to obtain the second timestamp information and the first NTP time as stored. Alternatively, when the protocol that is used for sending the packets of samples from the decoder equipment 12 to the audio playback equipment makes provision for messages acknowledging reception, then the second timestamp information and the first NTP time may be delivered by the audio playback equipment to the decoder equipment 12 in said acknowledgement messages.

Thus, the decoder equipment 12 receives the second timestamp information and the corresponding first NTP time from each selected piece of audio playback equipment.

On the basis of that, the decoder equipment 12 deduces whether each piece of audio playback equipment is playing too slowly or too quickly and what action needs to be taken in order to limit such drift and ensure synchronization in the reading of the audio stream.

Optionally, the decoder equipment 12 thus calculates the gradient of a linear regression line between the second timestamp information and the first NTP time.

The decoder equipment 12 then calculates the ratio between the calculated gradient and a predetermined theoretical gradient. By way of example, the predetermined theoretical gradient may be equal to the sampling rate of the audio stream (i.e. generally, but not necessarily, 48 kHz).

If the ratio is equal to 1, that means that the audio playback equipment in question is well synchronized and is playing neither too slowly nor too quickly.

If not, action is undertaken. This ratio is typically equal to the rate at which it is necessary to add samples to the audio stream or remove samples therefrom in order to ensure synchronized reading by the desynchronized audio playback equipment:
- if the ratio is equal to 1, then no samples should be added or removed;
- if the ratio is less than 1, then the audio playback equipment is playing the samples too slowly and it is therefore necessary to remove samples from the audio stream in order to ensure synchronized reading by said audio playback equipment. For example, if the ratio is 0.9 then it is preferable to remove one sample out of every 10 from the audio stream; and
- if the ratio is greater than 1, then the audio playback equipment is playing the samples too quickly and it is therefore necessary to add samples to the audio stream in order to ensure synchronized reading. For example, if the ratio is equal to 1.05 then it is necessary to add one sample for every 20 samples.

In a first a variant, the decoder equipment 12 splits the stream into packets in the usual way, and then adds or samples to each packet or removes samples therefrom (depending on the previously calculated ratio) prior to sending the packets to the destination audio playback equipment. Since the proportion of samples added or removed is small, the decoder equipment 12 does not apply a re-sampling filter, and in this example it merely removes excess samples directly or else adds additional samples directly (by way of example, the decoder equipment may duplicate samples of the audio stream for this purpose). Optionally, the decoder equipment 12 compresses the packets of samples prior to sending them to the audio playback equipment.

Thus, in this first variant, over time, the decoder equipment 12 may send packets of various sizes to the destination audio playback equipment.

In a second variant, the decoder equipment 12 splits the stream into packets in the usual way, and then applies a re-sampling filter to each packet with a re-sampling rate equal to the previously-calculated ratio.

Thus, over time, the decoder equipment 12 may send packets of various sizes to the destination audio playback equipment.

Figure 3:
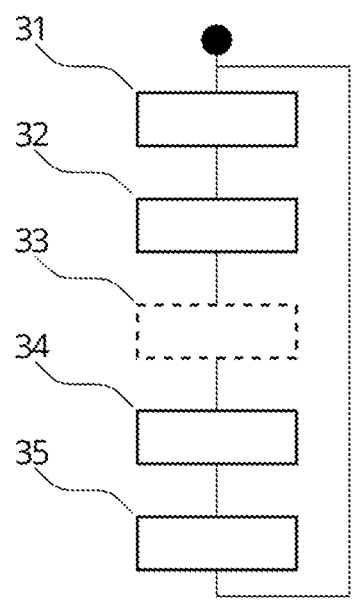
FIG. 3 is a diagram showing various steps in a particular implementation of the invention in source equipment of the installation shown in FIG. 1.

FIG. 3 shows a possible example of applying the second variant.

In a step 31, the decoder equipment 12 extracts a packet of samples from the audio stream and associates it with first timestamp information.

In a step 32, the decoder equipment 12 re-samples the packet of samples as a function of the previously calculated ratio (between the calculated gradient and the predetermined theoretical gradient).

In an optional step 33, the decoder equipment 12 compresses the packet of samples.

In a step 34, the decoder equipment 12 sends the packet of samples or the compressed packet to the audio playback equipment.

In a step 35, the decoder equipment 12 looks to see if it has received a new message from the audio playback equipment containing new second timestamp information. Where necessary, the decoder equipment 12 updates the calculated gradient, if any.

Thereafter, the decoder equipment 12 returns to step 31 to generate the following packet.

In a third variant, the decoder equipment 12 re-samples the audio stream (either indirectly by applying a re-sampling filter or else directly by removing or adding samples) prior to splitting it into packets and sending the packets to the destination audio playback equipment. Optionally, the decoder equipment 12 compresses the packets of samples prior to sending them to the audio playback equipment.

In this third variant, the packets that are sent may all have the same size since the re-sampling takes place before splitting into packets.

A solution is thus proposed in which correspondence information about correspondence between the identification information characteristic of the timestamp of a given packet and a reference clock (via the stored time) is communicated by the audio playback equipment to the source equipment, and not the other way round as in the prior art. This enables the source equipment to take action in order to ensure synchronization.

Advantageously, the pieces of audio playback equipment are then common commercially-available items, since the above-mentioned processor does not require any special features in order to implement the steps described.

Naturally, other implementations of the invention can be envisaged.

Thus, in a second implementation of the invention, the pieces of audio playback equipment 11a and 11b are not synchronized via the source equipment as in the above-described first implementation (where the source equipment is in reality the decoder equipment 12). In contrast, said pieces of equipment are grouped together in at least one group, and synchronization is performed at group level.

For this purpose, one of the pieces of audio playback equipment, referred to as the "master" audio playback equipment, recovers the audio stream and forwards said audio stream to the other piece of audio playback equipment (either in full or in part only; for example, the master audio playback equipment plays the left channel of a stream and forwards only the right channel to the other audio playback equipment).

In that configuration, in addition to playing back the left channel, the master audio playback equipment performs the role performed above by the decoder equipment 12. It is thus the master audio playback equipment that adjusts the samples going to the audio playback equipment (e.g. in accordance with one of the above-mentioned re-sampling variants described with reference to the first implementation), in order to preserve audio synchronization between the two loudspeakers.

In a first option, the reference clock is then the clock of the master audio playback equipment, which also delivers said reference clock to the other piece of audio playback equipment, e.g. using an NTP protocol. In a second option, the pieces of audio playback equipment reach an agreement about a common reference clock, e.g. by using the PTP protocol.

This second implementation enables two pieces of audio playback equipment to be synchronized in independent manner, while only one of the pieces of audio playback equipment needs to be provided with superior processor means capable of adjusting the samples (namely the master audio playback equipment). In this example, the other piece of audio playback equipment has standard processor means, potentially without the ability to process the audio stream.

In a third implementation, in certain circumstances, the source equipment may control the speed at which it reads the audio stream, e.g. because it is reading a file on a storage peripheral.

Under such circumstances, and preferably, the source equipment adjusts its reading speed to the mean value of the reading speeds of the pieces of audio playback equipment to which the audio stream is sent (which reading speeds can be deduced from the above-mentioned ratio between the gradients).

Thus, for each piece of audio playback equipment, processing of the audio stream is minimized, since priority is given to acting on the reading speed of the source equipment. This serves to improve the quality with which the audio stream is played back.

In particular, if there is only one piece of audio playback equipment, then the source equipment adjusts its reading speed to the internal clock of said piece of audio playback equipment and there is then no need to process the audio stream, thereby fully preserving the quality of the original audio stream.

Alternatively, the source equipment may adjust its reading speed to the median value of the reading speeds of the pieces of audio playback equipment to which the audio stream is sent, thereby minimizing processing since there is then at least one piece of audio playback equipment for which there is no need to process the audio stream, thereby once again improving the quality of the playback of the audio stream.

It should be understood that it is also possible to apply this adapting of the speed at which the stream is read to the master audio playback equipment in the second implementation.

In a fourth implementation, it can happen exceptionally, during a session of reading an audio stream, that one of the pieces of audio playback equipment has an internal clock presenting drift that is large and generally regular. By way of example, this might happen if the components managing the internal clock of the audio playback equipment are defective.

By way of example, such drift may be drift having a mean value lying in the range 0.5% to 1.5%. Preferably, such drift is drift having a mean value of 1%, lying in the range +0.8% to +1.2% in 95% of situations.

Under such circumstances, in order to minimize potential sound disturbances associated with excessive adjustment of the packets sent to the defective audio playback equipment, it is preferable to make adjustments to the packets both in the defective audio playback equipment and also in the source equipment (if its reading speed is adjustable as described for the third implementation) and/or indeed between the various pieces of audio playback equipment in a single group, thereby causing the adjustments to be individually smaller than a single large adjustment needed for the defective audio playback equipment.

By way of example, the adjustment may be shared between the source equipment and the target audio playback equipment: the source equipment adjusts its reading speed to half of the drift and adjusts the samples sent to the audio playback equipment to the other half of the drift.

By way of example, the adjustment may be shared between the non-defective audio playback equipment and the target audio playback equipment: the samples sent to the non-defective audio playback equipment are adjusted to half of the drift and the samples sent to the defective piece of audio playback equipment are adjusted to the other half of the drift.

Naturally, the invention is not limited to the implementations and embodiments described above, and variants may be provided without going beyond the ambit of the invention.

Thus, although above the decoder equipment is a decoder box, the decoder equipment could be any other equipment capable of performing audio decoding, such as an audio/video decoder, a digital video decoder, and for example it could be a game console, a computer, a smart TV, a digital tablet, a mobile telephone, a digital television decoder, a set-top box, etc. In general manner, although above the source equipment is decoder equipment, the source equipment could be any other equipment capable of supplying an audio stream to the audio playback equipment, such as a digital hi-fi system.

Although above the source equipment and the appliance are distinct, the source and the appliance could form portions of the same unit. In a variant, the appliance could be incorporated in the source equipment, e.g. incorporated in decoder equipment. In another variant, the source equipment could be incorporated in the appliance. Thus, it could be the appliance that delivers an audio stream directly to at least one of the pieces of audio playback equipment. Thus, by way of example, the source equipment could be incorporated in an appliance of mobile telephone and/or tablet type, the appliance performing both the "source equipment" function and also the "audio playback equipment management" function by means of appropriate applications. There could be two distinct applications, one performing the "audio playback equipment management" function and the other performing the "source equipment" function, or else both functions could be performed by a single application that combines both functions.

Although above the source equipment is distinct from all of the pieces of audio playback equipment, the source equipment and at least one of the pieces of audio playback equipment need not be distinct and could form portions of the same unit. This would apply for example if the piece(s) of audio playback equipment directly process(es) audio streams coming from an external network of Internet type. It would thus be possible to have one or more pieces of audio playback equipment constituting "smart" pieces of audio playback equipment (such as "smartspeakers"), thus being capable of operating without external decoder equipment since directly incorporating the source equipment, with such pieces of equipment playing an audio stream directly whether coming from an external network of Internet type or coming from a local network. This could equally well apply if the source equipment itself includes loudspeakers (e.g. if the source equipment is decoder equipment including loudspeakers).

The audio stream could thus be supplied to some or all of the audio playback equipment in a manner other than that described, e.g. using local area network (LAN) delivery via the appliance, using a Bluetooth link, or indeed by recovering the audio stream from a location on a network (of LAN or wide area network (WAN) type) as mentioned above. It could equally well be a piece of audio playback equipment that recovers the audio stream and forwards it to one or more other pieces of equipment in the same group.

Although above the appliance is distinct from all of the pieces of audio playback equipment, the appliance and at least one of the pieces of audio playback equipment need not be distinct and could form portions of the same unit.

It would thus be possible in a single unit to have at least an appliance, a piece of audio playback equipment, and source equipment, which would then not be distinct.

The installation could equally well have a plurality of pieces of source equipment and/or a plurality of appliances, it being understood that the pieces of source equipment, the appliances, and the pieces of audio playback equipment could be coupled together at least in pairs in one or more units.

Although above the appliance is a mobile telephone, the appliance could be any other element provided with or connected to a graphics control interface. The appliance could thus be of various different kinds: a dedicated appliance, a mobile telephone or a tablet executing a dedicated application, a computer executing a dedicated application, or some other appliance (game console, digital television decoder, smart TV, . . . ) operating in dedicated manner or executing a dedicated application. The appliance could be different from that described above, but it is preferably an appliance that is movable relative to the various pieces of audio playback equipment so as to be easy for a user to operate (in particular while going from one room to another). The appliance should then be of a size and a weight that enable a user to move it on its own by carrying it and that enable the user to operate said appliance without necessarily needing to put it down on a support.

Furthermore, although above the audio playback equipment is an external smartspeaker, it could be any other equipment having a loudspeaker, e.g. a sound bar, an audio system connected to a Wi-Fi/audio bridge, a loudspeaker other than a smartspeaker, . . . .

Although above the pieces of audio playback equipment are connected to the source equipment by a wireless network of Wi-Fi type, the pieces of audio playback equipment could be connected to the source equipment in some other way, e.g. by a wired network of Ethernet type, or by a wireless connection of Bluetooth type, or by any other connection means suitable for conveying audio data, and preferably synchronization data.

The numbers of pieces of audio playback equipment and/or of pieces of source equipment and/or of appliances could be other than described above.

It would thus be possible to have only a single piece of audio playback equipment in the installation, such as a sound bar or any other piece of multichannel audio playback equipment.

A plurality of appliances could be present in the installation, and the appliances could be of various kinds: a dedicated appliance, a mobile telephone or a tablet executing a controller application, a computer executing a controller application, or some other appliance (game console, digital television decoder, smart TV, . . . ) having a controller function or executing a controller application.

The various connections mentioned could be wired instead of being wireless.

Orders may be sent from the appliance to the pieces of audio playback equipment either directly or else indirectly, passing via the source equipment. Orders may also be sent from the source equipment to the audio playback equipment either directly or else indirectly, passing via the appliance.

Use could be made of protocols other than those mentioned. For example, instead of an NTP protocol, use could be made of one or more of the PTP, session control protocol (SPD), RTP, RTP control protocol (RTCP), . . . protocols for synchronizing the pieces of audio playback equipment and/or the streams conveyed in the installation.

Naturally, the numerical values given in the present application are purely indicative and thus not limiting.

Naturally, the various embodiments, implementations, options, . . . described above may be combined with one another.

Thus, the way the above-mentioned steps are shared between the source equipment and the audio playback equipment could be other than that described. For example, it could be one of the pieces of audio playback equipment that calculates the gradient and possibly the ratio between the calculated gradient and the predetermined theoretical gradient and that optionally delivers said calculated gradient and/or said ratio to the source equipment in the message, the correspondence information including or being constituted by said gradient and/or said ratio.

Some of the steps could be performed in the appliance instead of in the source equipment and/or in the audio playback equipment.

Although above the information characteristic of a timestamp for a packet is constituted directly by said timestamp (of RTP timestamp or indeed of MPEG timestamp type), said information could be different. By way of example, said information could merely be a number, such as a sequence number, e.g. if the packets are contiguous.

Although above the piece(s) of audio playback equipment send a message to the source equipment including correspondence information for all of the packets played, some or all of the audio playback equipment could send such a message for only some of the packets played, e.g. at predetermined time intervals.

Although above the processor means wait for notification that the buffer memory is ready to receive a new block of audio samples before injecting new blocks into the buffer memory, the processor means can be configured to persist in attempting to inject new blocks into a buffer memory that remains blocked until reaching a predetermined threshold of available space in said buffer memory.

Although above the reference clock is the internal clock of the source equipment, the reference clock could be different, and for example it could be a clock that is external to the installation, such as a public server on the Internet (of the NTP server type) or indeed it could be a clock that is negotiated between the source equipment and the pieces of audio playback equipment, e.g. by means of a peer-to-peer (P2P) protocol (of PTP type).

When synchronizing on an NTP server, it could thus be a public server on the Internet or else it could be directly the internal clock of the source equipment. In both situations, the pieces of audio playback equipment could thus send NTP requests to the server in question.

Furthermore, the internal clock of the decoder equipment could differ depending on the origin of the stream. For example, if the audio stream comes from an incoming video on demand (VOD) stream or if the audio stream comes from a stream stored on the hard disk of the decoder equipment, then the decoder equipment clock would be free and would come directly from its quartz crystal. In contrast, if the audio stream comes from an incoming TV stream (of satellite, cable, or DTT type), the decoder equipment clock should be servocontrolled on the broadcast clock using the PCR fields of the MPEG standard.

It is possible to envisage that the above description of synchronizing the pieces of audio playback equipment is also applied to the video playback equipment (or the audio/video playback equipment).

Although above the packets are split into blocks after being received, said packets need not be split into blocks and could be delivered unchanged by the audio playback equipment.

The stored time could be directly the time given by the reference clock when the first sample of at least one of the packets is played, or it could be representative of said time, e.g. being the time of injection into the buffer memory (since the time lapse between the moment of entry into the buffer memory and the actual moment of playback is constant).

The invention claimed is:

1. A method of managing an audio stream that is read by audio playback equipment in a manner that is synchronized on a reference clock, the audio playback equipment comprising an input buffer memory, the method comprising at least the following steps implemented in said piece of audio playback equipment:
   receiving the audio stream, the audio stream being in the form of packets, each packet comprising a succession of audio samples associated with at least a first identification information characteristic of a timestamp of said packet;
   playing the audio samples contained in each packet;
   the method further comprising the following steps implemented in the audio playback equipment:
      splitting each received packet into blocks of audio samples;
      determining at least a second timestamp information corresponding at least to one block of audio samples, both on the basis of the first identification information characteristic of a timestamp of the packet from which the block in question is extracted and also on the basis of the number of samples between a particular sample of said packet and a given sample of said block, the second timestamp information being determined by:
         point 1: calculation off an offset between the particular sample and the given sample;
         point 2: multiplication of offset of point 1 by a conversion ratio for converting a number of samples into timestamp information;
         point 3: addition of the result of point 2 to the first timestamp information in order to obtain the second timestamp information;
      injecting the block into the buffer memory by copying the block at the end of the buffer memory when reaching a predetermined threshold of available space in said buffer memory;
   the method comprising the steps of:
      storing a time given by the reference clock at the moment at which the given sample of the block is injected in the buffer memory,
      sending a message including at least one correspondence information between the first identification information characteristic of a timestamp of said packet and the time stored, the correspondence information comprising said second identification information corresponding to the block and said time stored.

2. The method according to claim 1, wherein the correspondence information consists in the value of said second identification information and said stored time.

3. The method according to claim 1, wherein the correspondence information consists in the gradient of a linear regression line between said second identification information and said stored time.

4. The method according to claim 1, comprising the following additional steps implemented in the audio playback equipment:
   for at least one packet N received by the audio playback equipment, calculating expected identification information characteristic of a timestamp expected for the following packet N+1, and adding together the identification information characteristic of a timestamp of the packet that has just been received and its duration; and
   when the packet N+1 is received, comparing said expected identification information with the identification information of the packet N+1.

5. The method according to claim 4, wherein if the identification information of the packet N+1 is later than the expected identification information, then the audio playback equipment plays compensation samples for a duration corresponding to the difference between the expected identification information and the identification information of the packet N+1.

6. The method according to claim 5, wherein the compensation samples are silence and/or copies of the most recently played samples.

7. The method of managing an audio stream that is read in a manner that is synchronized on a reference clock and that is delivered via at least one piece of source equipment, the method comprising at least the following steps implemented in said source equipment:
   first step: splitting the audio stream into packets, each packet comprising a succession of audio samples;
   second step: associating each packet with identification information characteristic of a timestamp of said packet, which information is thus representative of the time at which a predetermined audio sample of said packet should be played by audio playback equipment;
   third step: receiving a message comprising at least correspondence information about correspondence between the identification information characteristic of a timestamp of at least one of the packets and the time given by the reference clock that is characteristic of the moment at which the predetermined audio sample of said packet was injected in the buffer memory of an audio playback equipment adapted to perform the method according to claim 1;

fourth step: as a function of said correspondence information, adjusting the speed at which the audio stream is read as a function of said correspondence information and/or adjusting the following packet before sending it.

8. The method according to claim 7, wherein the step of adjusting the following packet is performed by adjusting the number of audio samples contained in the packet.

9. The method according to claim 8, wherein the number of samples is adjusted by removing audio samples from said packet or by adding audio samples thereto.

10. The method according to claim 9, wherein the number of samples is adjusted while conserving a packet size that is identical to the size of the packet that was delivered previously.

11. The method according to claim 7, wherein the following packet is adjusted by applying a re-sampling filter to said packet.

12. Source equipment adapted to perform the method according to claim 7.

13. Audio playback equipment adapted to perform the method according to claim 1.

14. An installation comprising at least one first piece of audio playback equipment according to claim 13 and a second piece of audio playback equipment configured to deliver the audio stream to said first piece of audio playback equipment, the second piece of audio playback equipment itself adjusting said stream if the other piece of audio playback equipment is not reading it at the proper speed.

15. A non-transitory computer readable storage medium storing a computer program including instructions for causing source equipment adapted to execute the method according to claim 7.

16. An installation comprising at least one first piece of audio playback equipment adapted to perform the method according to claim 1 and source equipment adapted to perform a method of managing an audio stream that is read in a manner that is synchronized on a reference clock and that is delivered via at least one piece of source equipment, the method comprising at least the following steps implemented in said source equipment:

first step: splitting the audio stream into packets, each packet comprising a succession of audio samples;

second step: associating each packet with identification information characteristic of a timestamp of said packet, which information is thus representative of the time at which a predetermined audio sample of said packet should be played by audio playback equipment;

third step: receiving a message comprising at least correspondence information about correspondence between the identification information characteristic of a timestamp of at least one of the packets and the time given by the reference clock that is characteristic of the moment at which the predetermined audio sample of said packet was injected in the buffer memory of an audio playback equipment adapted to perform the method according to claim 1;

fourth step: as a function of said correspondence information, adjusting the speed at which the audio stream is read as a function of said correspondence information and/or adjusting the following packet before sending it.

17. A non-transitory computer readable storage medium storing a computer program including instructions for causing audio playback equipment adapted to execute the method according to claim 1.

* * * * *